United States Patent [19]

Maeda

[11] Patent Number: 5,442,497
[45] Date of Patent: Aug. 15, 1995

[54] HEAD SHIFTING DEVICE IN A RECORDING AND/OR REPRODUCING APPARATUS

[75] Inventor: Masaya Maeda, Yokohama, Japan

[73] Assignee: Canon Kabushiki Kaisha, Tokyo, Japan

[21] Appl. No.: 60,682

[22] Filed: May 12, 1993

Related U.S. Application Data

[63] Continuation of Ser. No. 758,450, Sep. 6, 1991, abandoned, which is a continuation of Ser. No. 431,708, Nov. 2, 1989, abandoned, which is a continuation of Ser. No. 183,419, Apr. 18, 1988, abandoned, which is a continuation of Ser. No. 805,958, Dec. 5, 1985, abandoned.

[30] Foreign Application Priority Data

Dec. 6, 1984 [JP] Japan .................. 59-257906

[51] Int. Cl.$^6$ .................. G11B 21/02
[52] U.S. Cl. .................. 360/75; 360/78.01; 360/78.13; 369/32
[58] Field of Search .......... 360/75, 77.02, 77.06, 360/77.07, 78.01, 78.02, 78.04, 78.08, 78.13, 78.14, 105, 106, 109; 364/32, 33, 41; 318/561, 685, 696

[56] References Cited

U.S. PATENT DOCUMENTS

| | | | |
|---|---|---|---|
| 3,646,261 | 2/1972 | Kinjo et al. | 360/78 |
| 3,956,766 | 5/1976 | Hanson et al. | 360/75 |
| 3,977,024 | 8/1976 | Haneji et al. | 360/78 |
| 4,272,793 | 6/1981 | Van Landingham | 360/78 |
| 4,313,141 | 1/1982 | Yanagida et al. | 360/78 |
| 4,394,696 | 7/1983 | Yoshimaru | 360/78 |
| 4,594,620 | 6/1986 | Shoji et al. | 360/75 |
| 4,620,244 | 10/1986 | Krause | 360/78 |
| 4,627,043 | 12/1986 | Uehara | 360/78 |
| 4,698,702 | 10/1987 | Miyake | 360/78.04 |

OTHER PUBLICATIONS

IBM TDB vol. 19, No. 4, "Head-to-Track Synchronizing Mechanism for Magnetic Disks" Porter et al., Sep. 1976, pp. 1393–1395.

Primary Examiner—Roy N. Envall, Jr.
Assistant Examiner—Steven R. Garland
Attorney, Agent, or Firm—Anderson Kill Olick & Oshinsky

[57] ABSTRACT

In a head shifting device where a head is shifted by a first prescribed amount for every n ($\geq 2$) drive steps of a stepwise drive source, the positioning of the head is performed in such a way that before the fact that the head has overrun a prescribed position is detected, the head is shifted stepwise by the aforesaid first prescribed amount, and it is then driven by a second prescribed amount, defined by m ($<n$) drive steps of the stepwise drive source, so that the head is shifted back stepwise and is stopped when the fact that the aforesaid prescribed position has been reached is detected.

29 Claims, 4 Drawing Sheets

HEAD SHIFTING DEVICE IN A RECORDING AND/OR REPRODUCING APPARATUS

This is a continuation application of Ser. No. 07/758,450, filed Sep. 6, 1991; which in turn is a continuation application of Ser. No. 07/431,708, filed Nov. 2, 1989; which in turn is a continuation application of Ser. No. 07/183,419, filed Apr. 18, 1988; and which in turn is a continuation application of Ser. No. 06/805,958, filed Dec. 5, 1985, all which are abandoned.

BACKGROUND OF THE INVENTION

1. Field of the Invention

This invention relates to a recording and/or reproducing apparatus using, for example, a disc-shaped record bearing medium, and, more particularly, to a head positioning method.

2. Description of the Prior Art

It is known in the art of a recording and/or reproducing apparatus using a disc-shaped record bearing medium, for example, a magnetic disc, to provide a device for shifting a magnetic head to permit concentric or helical recording of signals or reproducing the thus-recorded signals as constructed with a rotative-to-linear motion gearing transmission between a stepping motor and a carrier for the magnetic head so that the head can be shifted stepwise along the radius of the magnetic disc.

For the adjustment of position of the magnetic head to be controlled without detecting the absolute position, it is also known to provide an open loop control system in which the initial position of the magnetic head is adjusted to a particular setting with the stepping motor in the corresponding angular position, and the operation of an up/down counter for memorizing the position of the head is controlled in accordance with the driving of the stepping motor.

In this case, therefore, it is of great importance to locate the head in the start position with high accuracy. And, the conventional method of determining whether or not the head is set in the start position, is to employ photo-electric transducer means arranged to cooperate with the head carrier.

Meanwhile, as the recording density is increased by the recent development of magnetic sheets of higher quality and magnetic heads of improved performance, the track width and track pitch are narrowing. Under such a situation, the accuracy of adjustment of the initial position of the magnetic head is required to further increase, and an auto-tracking capability must be introduced to assure constant establishment of the on-tracking condition when in reproduction. As far as achievement of the latter is concerned, the amount the head moves each time the stepping motor rotates one step may be made reasonably smaller than the track pitch by assigning a plurality of drive steps of the motor to every one track pitch. With the use of such auto-tracking system, if the amount by which the head shifts when it is brought into setting in the start position is left unchanged from that equal to one track pitch, the following problem will, however, arise.

Taking, as an example, the video floppy disc having concentric fifty tracks of 60 $\mu$m wide with a pitch of 100 $\mu$m, in a recording and/or reproducing apparatus having a stepping motor whose one step represents an angle of rotation of 18° and a speed reduction for shifting the magnetic head one track pitch by pitch for every 12 steps of the motor, and assuming that when in recording, a train of drive pulses with a frequency lying in a self-excitation range are applied to the stepping motor so that the magnetic head is shifted stepwise by a unit of one track pitch, and, when in reproduction, the position of the head is adjusted with an accuracy of the unit of one step, namely, 100/12 8.6 $\mu$m in order to insure that the output of the magnetic reproducing head is optimum.

Further assuming that when bringing the magnetic head to the start position, the accuracy of detection of when the start position is reached, is left equal to the unit of one track pitch, then, if it happens that the phase of the rotor of the stepping motor relative to the stator thereof is caused to accidentally change by a shock or vibration of larger force than the residual torque of the stepping motor given to the apparatus when not in use, the use of the open loop control system for the stepping motor will result in the adjustment of the magnetic head to such an erroneous start position as is different from the true one by an amount corresponding to the changed value of phase, because movement of the magnetic head toward the start position begins at a position of deviated phase when the apparatus is switched on again. Since the accuracy with which the adjustment of the magnetic head to the start position is as rough as unity of track pitch, the magnetic head is caused to access the start position with an error of integer multiples of 8.6 $\mu$m in amount from the true one, that is, with inclusion of a deviation.

And, when recording goes on from such an erroneous start position, the magnetic head does not coincide with any of the positions that all the tracks should take respectively.

SUMMARY OF THE INVENTION

With the foregoing in mind, the present invention has been made and its general object is to provide a novel head positioning method which is able to eliminate all the above-described conventional drawbacks of a head shifting device of the type in which a head is moved by a prescribed amount with a plurality of drive steps of a stepwise drive source.

Another object is to provide a novel head positioning method which allows for good assurance of accurate and reliable alignment of a head to any of the positions as it should be when in recording or reproduction.

Still another object is to provide a novel head positioning method which enables an operation of correcting the deviation of the position of the head from that it should take when in recording and/or reproduction, to be performed quickly and easily.

Under these objects, according to one aspect of the invention, in application to a head shifting device in which n ($\leq 2$) drive steps of the stepwise drive source represents a first prescribed amount by which a head moves, a head positioning method is proposed that before the head overruns a prescribed position, the head is shifted stepwise by the aforesaid first prescribed amount, and after the overrunning is detected, the head is shifted back stepwise by a second prescribed amount defined by m ($<$n) drive steps of the stepwise drive source until stopped when the aforesaid prescribed position is reached.

The point to notice here is that the smaller the value of m, the higher the accuracy of positioning can be improved. Most preferably, as illustrated in embodiments of the invention, m=1. As to n, on the other hand, taking it at a sufficiently large value contributes to an increase in the accuracy. Also, each shift amount of the head for n steps, or the first prescribed amount, is preferably made equal to one track pitch (1TP). Therefore, in the case of m=1, the second prescribed amount, that is, the accuracy of adjustment of the position becomes 1TP/n.

A further object of the invention is to provide a head positioning method which is able to set the drive source in a prescribed phase of rotation always just before the head starts to shift for the purpose of altering the recording position and/or reproducing position (track).

Under such an object, according to another aspect of the invention, in application to a head shifting device in which a plurality of drive steps of the stepwise drive source represents a prescribed amount by which a head is shifted, a head positioning method is proposed that the head is shifted stepwise first by the aforesaid prescribed amount, and upon detection of the fact that the head has overrun a prescribed position, the head is shifted toward the prescribed position until the drive source comes to a prescribed phase.

These and other objects, aspects, and features of the invention will become apparent from the following description of embodiments thereof taken in conjunction with the accompanying drawings.

DETAILED DESCRIPTION OF THE PREFERRED EMBODIMENTS

The present invention will next be described in connection with preferred embodiments thereof by reference to the drawings. Though the illustrated embodiments will be described as applied to such a type of recording and/or reproducing apparatus that the record bearing medium is in the form of a disc-shaped magnetic sheet, it is of course needless to say that the present invention is not confined to such illustrated embodiments. It should be recognized that the invention is applicable to a wide variety of other types of recording and/or reproducing apparatus, for example, those using cylinder-shaped or tape-shaped record bearing medium, provided that the adjustment of the position of the head to a prescribed setting must be controlled with high accuracy.

Figure 2A:
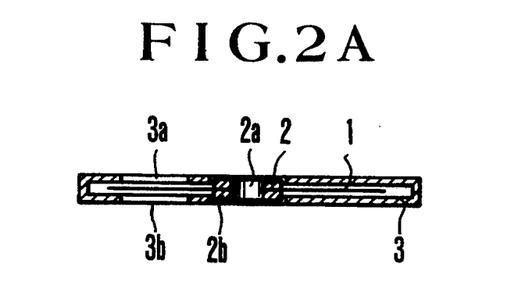
FIG. 2A is a sectional view of a cassette.
Figure 2B:
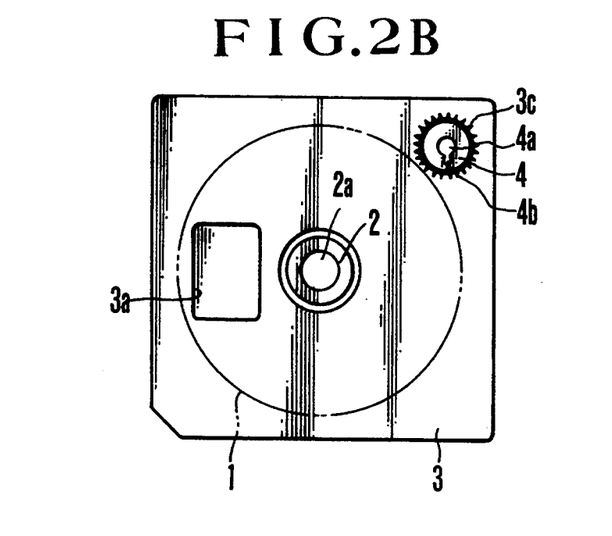
FIG. 2B is a plan view of it.

Referring first to FIGS. 2A and 2B, a cassette 3 containing a disc-shaped magnetic sheet 1 has its upper and lower halves provided with a stabilizer plate entrance window 3a and a magnetic head entrance window 3b respectively. A center core 2 in a central portion of the area of the sheet 1 has a central hole 2a into which is inserted a drive spindle of a motor for rotating the sheet 1. On the lower surface of the center core 2 there is a magnetizable yoke 2b made of iron plate or the like.

A track counter 4 is rotatably mounted on the cassette 3 and is click-stopped in prescribed angles of rotation by means (not shown), indicating what track is being recorded, or the number of recorded tracks. 4a is a hole into which a drive spindle of the counter reel is inserted; 4b is a key groove into which a key formed as a unit with the drive spindle is inserted. The aforesaid recording track number or the number of recorded tracks is indicated by the key groove 4b as an index cooperative with a scale 3c on the cassette 3.

Figure 1:
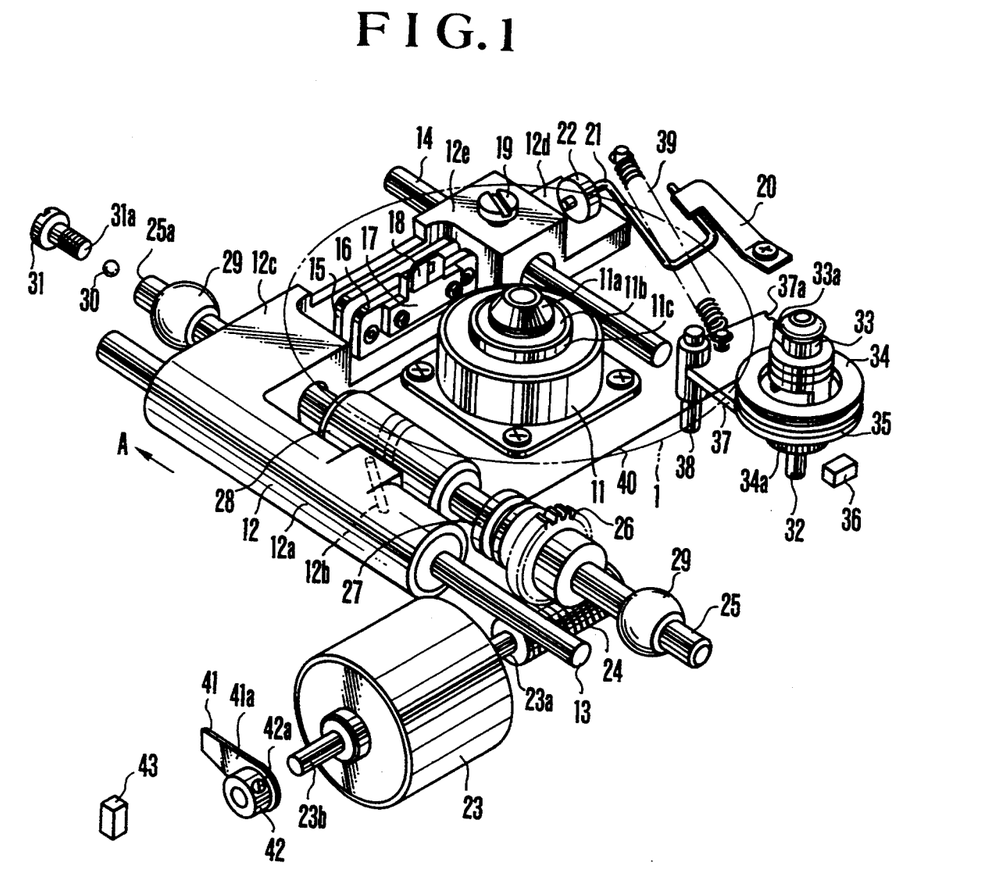
FIG. 1 is a perspective view of the main parts of a recording and/or reproducing apparatus employing the method of the invention.

In FIG. 1, there is shown a recording and/or reproducing apparatus using the magnetic sheet cassette of FIGS. 2A and 2B including an electric motor 11 having a spindle 11a and a flanged portion 11c on which is mounted a permanent magnee ring 11b as a chucking means. This spindle 11a fits in the central hole 2a of the center core 2 upon rotation to drive rotation of the magnetic sheet 1. It should be noted that, at this time, the permanent magnet 11b attracts the magnetizable yoke 2b provided on the lower surface of the center core 2, and the flanged portion 11c supports the center core 2.

A head carrier 12 of almost letter "L" shape is axially slidably supported on guide shafts 13 and 14, and the side wall of its cylinder portion 12a is provided with an engagement pin 12b in gearing engagement with a screw 28 to be described later. Its bridge portion 12c is further provided with magnetic head position adjusting members 15 and 16. A magnetic head 18 as the recording and/or reproducing head is supported by the adjusting member 16 through a head support member 17 and faces up the back or recording surface of the magnetic sheet 1. The magnetic head 18 is arranged to shift radially along the magnetic sheet 1.

The other end 12d of the bridge portion 12c of the head carrier 12 is pushed downward by a roller 22 on one end of a roller support member 21 of almost letter "U" shape, of which the other end is pressed by the free end of a leaf spring 20 fixedly secured at the other end to a chassis (not shown) of the apparatus. An embossed portion 12e of the head carrier 12 to the guide shaft 14 is provided with a screw 19 whose tip abuts on the guide shaft 14. Therefore, by adjusting the amount of threaded-in length of the screw 19, the head carrier 12 is finely turned about the guide shaft 13. Thus, the height or clearance of the magnetic head 18 to the magnetic sheet 1 can be adjusted. It should be noted that the head carrier 12 is always urged in a direction of arrow A by a spring (not shown).

A stepping motor 23 as the stepwise drive source for head shifting has two output shafts 23a and 23b of which the former fixedly carries a worm gear 24 meshing with a worm wheel 26. The worm wheel 26 is fixedly mounted on a common rotatable shaft 25 of the screw 28 and a capstan 27. The shaft 25 is rotatably supported on bearings 29 at both ends thereof. The screw 28 engages with the pin 12b on the side wall of the cylinder portion 12a of the head carrier 12.

A steel ball 30 is sandwiched between the tip of an adjusting screw 31 and the end surface 25a of the rotatable shaft 25. By turning the adjusting screw 31, meshing with a female-screw (not shown) provided in the chassis, the rotatable shaft 25 can be finely axially moved, which, in turn, causes the head carrier 12 to change its position along the guide shafts 13 and 14 through the engaging pin 12b. Thus, the relative position of the magnetic head 18 to the spindle 11 can be finely adjusted. Because the screw 28 engages with the engaging pin 12b of the head carrier 12, the rotating torque of the stepping motor 23 is transmitted through the worm gear 24, the worm wheel 26 and the screw 28 to the engaging pin 12b and therefrom to shift the head carrier 12 along the guide shafts 13 and 14.

Because, as has been described above, the head carrier 12 is urged by the spring (not shown) in the direction A, the screw 28 that engages with the engaging pin 12b, and therefore, the rotatable shaft 25 also are urged to the direction A. Hence, in combination with the adjustment of the adjusting screw 31, the accuracy of positioning of the magnetic head 18 is improved. Moreover, the backlash between the screw 28 and the engaging pin 12b is also absorbed.

A spindle 33 is inserted into the hole 4a of the counter 4 and is provided with a key portion 33a adapted to fit in the key groove 4b. The counter spindle 33 is arranged to be immovable (in unison) in the rotative direction relative to the counter reel 34 rotatably mounted on a shaft 32 but movable in the axial directions. It should be noted that, the spindle 33 is urged upward by a spring (.not shown) relative to the reel 34. Also, a portion of the reel 34 is provided with a gear portion 34a.

A sector gear 37 is meshed with the geared portion 34a of the reel 34 and is rotatably mounted on a shaft 38 fixed to the chassis of the apparatus. A spring 39 urges the sector gear 37 in a counterclockwise direction, thereby urging the counter reel 34 in a clockwise direction through the meshing engagement between a geared portion 37a and the geared portion 34a.

A wire 40 made of, for example, tungsten, is trained between the counter reel 34 and the capstan 27 fixedly mounted to the rotatable shaft 25. The diameters of the counter reel 34 and the capstan 27 and the size of the wire 40 are so determined that the angle of rotation of the screw 28 necessary to shift the magnetic head 18 one track pitch translates to a prescribed angle of rotation of the counter spindle 33. With this, the counter spindle 33 rotates correspondingly to the shifting of the magnetic head 18.

Figure 3:
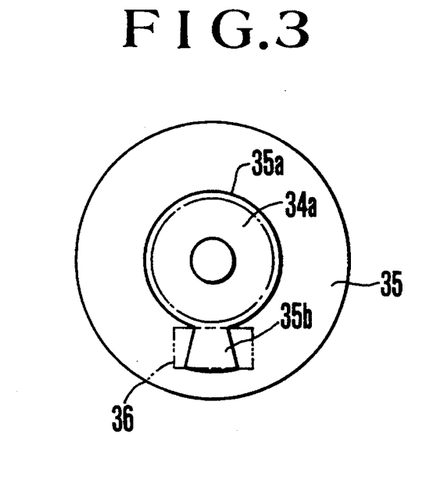
FIG. 3 is a cross-sectional view taken above a reflector plate and looking from the above of the reflector plate along with a photo-electric detector and a gearing portion of a track counter reel.

A reflection plate 35 (reflector) is adhered to the lower surface of the counter reel 34 and is made of, for example, metal. A photo-electric detector 36 comprises a light-emitting diode and a photo-transistor. As shown in FIG. 3, the reflector 35 has a central round aperture 35a in which the geared portion 34a of the counter reel 34 is fitted, and a cutout portion 35b in the radial direction thereof. The photo-electric detector 36 is arranged so as to detect the cutout portion 35b.

Figure 4:
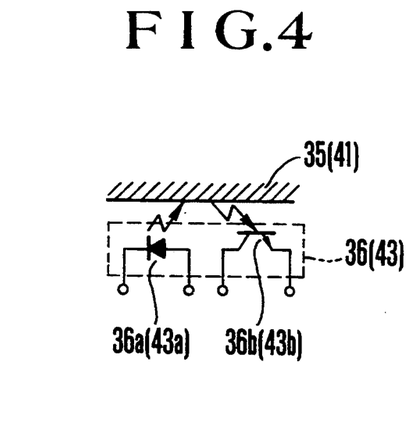
FIG. 4 is a schematic sectional view of a position detecting arrangement of the reflector plate, phase sensor and photo-electric transducer.

The structure of construction of the photo-electric detector 36 and its operation are described with reference to FIG. 4. The photo-electric detector 36 is constructed with a light-emitting diode 36a and a photo-transistor 36b. Light from the light-emitting diode 36a is reflected from the reflector 35 to the photo-transistor 36b, thereby turning on the photo-transistor 36b. Then, as the counter reel 34 rotates, when the cutout portion 35b comes just above the photo-electric detector 36, the light from the light-emitting diode 36a no longer enters the photo-transistor 36b. Thus, the photo-transistor 36b turns off. It should be noted that in FIG. 4, the reference numerals in the parentheses will be explained below.

Referring again to FIG. 1, the other output shaft 23b of the stepping motor 23 fixedly carries a phase detecting member 41 whose one surface 41a functions as a reflection surface with a boss portion 42 fixedly secured to the shaft 23b by a screw fastener 42a. Another photo-electric detector 43 is arranged to face the reflection surface 41a of the phase detecting member 41 and is fixedly secured to the chassis (not shown). This second photo-electric detector 43 is similar in construction to the first one 36. As indicated by the reference numerals in the parentheses in FIG. 4, the second photo-electric detector 43 comprises a light-emitting diode 43a and a photo-transistor 43b. When the reflection surface 41a of the phase detecting member 41 comes opposite to the photo-electric detector 43, light from the light-emitting diode 43a enters the photo-transistor 43b, thereby turning the latter on. Then, when the phase detecting member 41 moves away from the position opposite to the photo-electric detector 43, the light from the light-emitting diode 43a does not enter the photo-transistor 43b, and the latter turns off.

Here, an explanation is made about the method of positioning the magnetic head with inclusion of the operation of the apparatus of such construction. When the cassette 3 containing the magnetic sheet 1 is loaded on the apparatus, the center core 2 of the sheet 1 rests on the drive spindle 11a of the motor 11. Therefore, the sheet 1 is driven to rotate by the motor 11.

Meanwhile, when the stepping motor 23 rotates, its rotation is transmitted through the worm gear 24 to the worm wheel 26 meshing therewith and therefrom to rotate the shaft 25. Thereby the screw 28 and the capstan 27 are both driven to rotate. Rotation of the screw 28 is transmitted through the engaging pin 12b to axial move the head carrier 12 along the guide shafts 13 and 14. Therefore, the magnetic head 18 is caused to move in the radial direction of the magnetic sheet 1 while recording signals on the magnetic sheet 1 from track to track.

Meanwhile, as the capstan 27 rotates, the wire 40 is wound in, thereby the counter reel 34 is turned in the counterclockwise direction against the clockwise operating bias force for the counter reel 34 by the sector gear 37 urged by the spring 39 in the counterclockwise direction. Therefore, the counter spindle 33 is driven to rotate also in the-counterclockwise direction. Thereby the counter 4 in the cassette 3 is driven to advance stepwise, indicating what track number is in recording or what number of tracks are recorded.

Here, an explanation is made about the position adjustment of the reflection plate 35 and the phase detecting member 41.

In the embodiment of the invention, on the assumption that the angle of one step of the stepping motor 23 is, for example, 18°, the diameters and gear pitches of the worm gear 24, worm wheel 26 and screw 28 are so determined that the magnetic head 18 shifts one track pitch of, for example, 100 μm for every 12 steps of the stepping motor 23, and the counter reel 34 and the spindle 33 are arranged to rotate, for example, 6° for every one track pitch.

It should be noted that the tracks on the magnetic sheet 1 are numbered from the outermost one as the first track, and are 50 in total number inwardly formed in concentric relation.

The position of the cutout portion 35b of the reflection plate 35 is so determined that when the magnetic head 18 is positioned outwardly of the first track of the magnetic sheet 1, the cutout portion 35b comes just opposite to the photo-electric detector 36. At this time, light from the light-emitting diode 36a does not enter the photo-transistor 36b, and, therefore, the photo-transistor 36b turns off. With this, it is made possible to detect when the magnetic head 18 overruns a position equivalent to the first track outward by sensing the point in time when the photo-transistor 36b turns off.

On the other hand, the phase detecting member 41 is located so that when the magnetic head 18 takes the position equivalent to the first track the phase detecting member 41 comes just opposite to the photo-electric detector 43. It should be noted that setting of this position is carried out either by assessing the level of the output signals reproduced from the first track of the magnetic sheet 1, or by viewing it through an optical instrument such as a microscope.

The operation of adjusting the position of the magnetic head 18 to this setting is carried out as follows: At first, the magnetic head 18 is allowed to shift by a distance of 100/12 8.6 μm as the stepping motor 23 rotates by the angle of one step, until it comes near the prescribed start position in alignment with the first track. Then, the phase detecting member 41 is manually turned into alignment with the photo-electric detector 43. Then, the adjusting screw 31 is turned to bring the head carrier 12 with the magnetic head 18 into precise alignment with the first track. Since the movement of the adjusting screw 31 does not affect the relationship of the phase of the rotor of the stepping motor 23 to the stator thereof, if the position of the magnetic head 18 is later detected in the unit of one step of the stepping motor 23, the accuracy of detection of when the magnetic head 18 comes in alignment with the first track is insured to the within 8.6 μm.

It should be noted that after the phase detecting member 41 has been aligned to the photo-electric detector 43, the fastener screw 42a is turned to fix the boss 42 to the end of the output shaft 23b of the stepping motor 23. Therefore, when the phase detecting member 41 in alignment reflects light from the light-emitting diode 43a to the photo-transistor 43b, the fact that the magnetic head 18 has been positioned in alignment with the first track can be detected.

Figure 5:
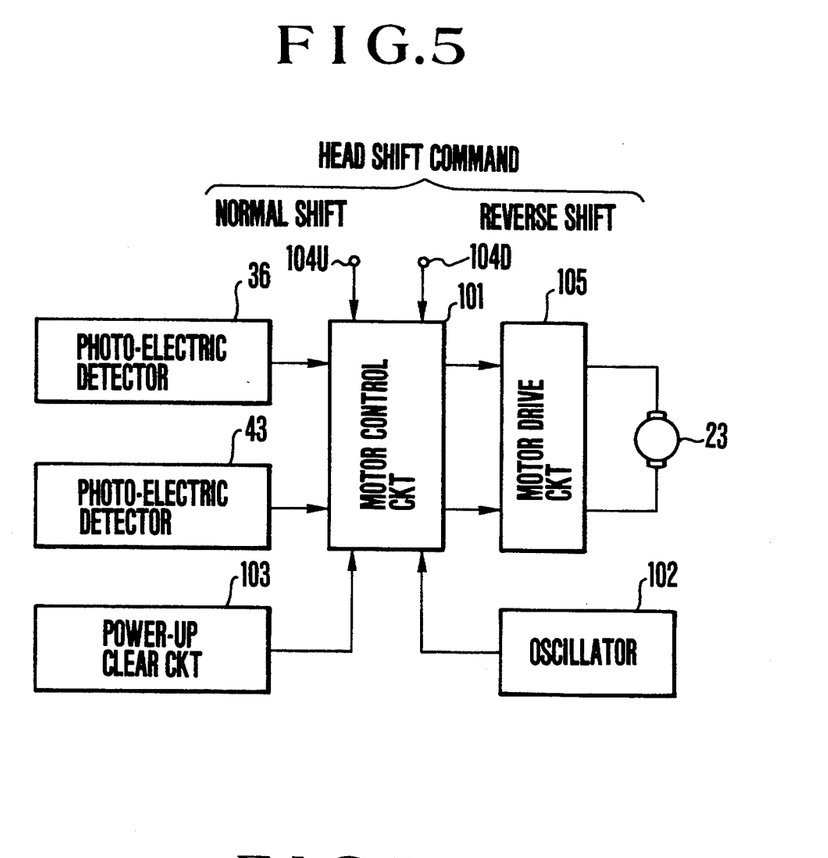
FIG. 5 is a block diagram of an example of a control system for the stepping motor.

FIG. 5 illustrates an example of the control system for the stepping motor 23. A motor control circuit 101 controls the positioning operation of the magnetic head 18 to the start position when an electric power source is turned on, (in this embodiment, the start position is in alignment with the first track, as has been described above), and the shifting of the magnetic head from track to track when in the later recording or reproduction operation. This motor control circuit 101 performs the controlling operation on the basis of a clock signal from a standard clock generating oscillator 102, a power-up clear signal from a circuit 103, the outputs of the photo-electric detectors 36 and 43, and magnetic head operation commands (forward movement and reversed movement) given to input terminals 104U and 104D. A motor drive circuit 105 directs motion of the stepping motor 23 on the basis of a motor direction command (MDC) from the motor control circuit 101 and a motor actuating clock pulse CLK.

Figure 6:
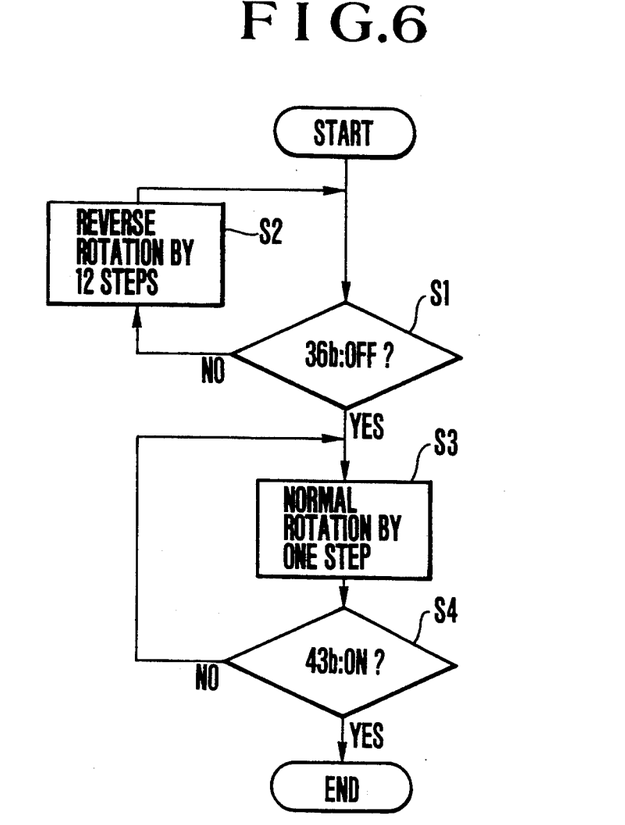
FIG. 6 is a chart of a sequence of operations of bringing the magnetic head to an equivalent position to the first track on the magnetic disc.

Next, a sequence of operations in the mode of bringing the magnetic head 18 into alignment with the first track is described by reference to the program of FIG. 6, where the blocks are labelled S1 to S4 which also represent respective steps of the sequence. And in this embodiment, as the stepping motor 23 rotates forward, the magnetic head 18 moves toward the center of the magnetic sheet 1, and when the direction of rotation is reversed, it moves toward the outer periphery.

The positioning of the magnetic head 18 in alignment with the first track is carried out by the power-up clear signal from the circuit 103 of FIG. 5 when the system is reset by throwing the power switch. At this time, the position of the magnetic head 18 cannot be recognized by the control circuit 101. Therefore, at first, whether or not the magnetic head 18 is on the outer side of the corresponding position to the first track is examined. That is, since, if the magnetic head 18 is not on the outer side, the photo-transistor 36b of the photo-electric detector 36 is not off, it is in the step S1 of FIG. 6 that the control circuit 101 examines whether or not the photo-transistor 36b is off. If not off, the stepping motor 23 is caused to rotate in the reverse direction 12 steps in the step S2 of FIG. 6; thereby, the head carrier 12 is moved to shift the magnetic head 18 one track pitch toward the outer periphery of the magnetic sheet 1. If even this shifting does not turn off the photo-transistor 36b, the aforesaid operation is recycled. Such procedure repeats itself until the photo-transistor 36b turns off. As the magnetic head 18 shifts by a distance equal to the sum of 12 steps of the stepping motor 23, when it overruns the start position outward, the photo-transistor 36b turns off. Of course, if the photo-transistor 36b is off from the beginning in the step S1, a transfer to the next step S3 takes place.

After, in such a manner, the fact that the magnetic head 18 lies on the outer side of the start position, the control circuit 101 in the next step S3 causes the stepping motor 23 to rotate in the forward direction by, for now, one step, or 1/12 track pitch, thereby the magnetic head is shifted back 1/12 track pitch. In the next step S4, whether or not the photo-transistor 43b has been turned on is examined. Such an operation is recycled until the photo-transistor 43b turns on. When the photo-transistor 43b turns on, the magnetic head 18 is found to be just in alignment with the first track.

Also, in this case, under the condition that the photo-transistor 43b is on, the rotary shaft of the motor 23, therefore, the rotor, has always a prescribed phase of rotation, that is, a drive phase. Therefore, if the drive phase number of the motor 23 is made equal to a value obtained by dividing the number of steps (12 steps) by an integer, for example, to "4", when the position of the head 18 is altered (the recording and/or reproducing position is altered), it is possible to insure that the motor 23 starts always from a prescribed drive phase.

After the positioning of the magnetic head 18 into alignment with the first track has been completed as has been described above, the control circuit 101 drives the stepping motor 23 by 12 steps so that the magnetic head 18 is shifted from track to track in response to the command at the input 104U or 104D.

By the system described above, the position of the magnetic head 18 to the setting in the first track can be adjusted with as high an accuracy as the one-step accuracy of rotation of the stepping motor 23, or the indexing accuracy of 1/12 track pitch, It should be noted that in the embodiment of the invention, the phase detecting member 41 may not be opposed to the photo-electric detector 43 until the magnetic head 18 moves from a point on the outer side of the first track to the first track. And, in the case of the embodiment, each time the stepping motor 23 rotates one revolution, the magnetic head 18 moves a distance equal to 360°/(18°×12) 1.6 track pitches. In correspondence to this distance, the counter 4 rotates an angle of 1.6×6°=9.6° or about 10°. Therefore, the accuracy of detection of the combination of the reflection plate 35 and the photo-electric detector 36 as the detecting means for detecting that the magnetic head 18 reaches beyond the first track outward is not necessarily more than 1.6 track pitches.

It is, therefore, also possible to substitute for the combination of the reflection plate 35 and the photo-electric detector 36, a mechanism that directly detects the overrunning of the head carrier 12.

Figure 7:
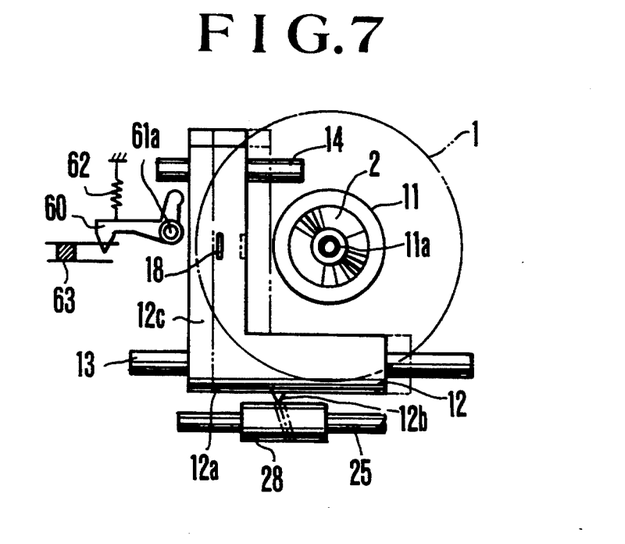
FIG. 7 is a schematic top plan view of means for detecting whether or not the magnetic head has overrun the start position outward by directly sensing the moving of the head carrier.

That is, as shown in FIG. 7, when the magnetic head 18 is positioned on the outer side of the first track of the magnetic sheet 1, a lever 60 is turned about a shaft 61a by the head carrier 12 in a counterclockwise direction against a spring 62. And, when the magnetic head 18 is positioned on the outer side of the first track, a normally open type switch 63 is closed by the lever 60. Instead of using such detecting means comprising the lever 60 and the switch 63, it is further possible to detect the position of the head carrier 12 photo-electrically.

Though the present invention has been described in connection with embodiments applied to the magnetic type head shifting device, it is to be understood that the present invention is applicable to other types of head shifting devices in a recording and/or reproducing apparatus using the static capacity type, optical type disc-shaped record bearing media, or other types of record bearing media with minor modifications. Even to the apparatus in which the first track is taken at the inner most one, or the start position is in a desired position different from the first track, the present invention can be applied without any loss in its advantages.

Further the preliminary setting of the head 18 to a position beyond the first track (in the steps S1 and S2 of FIG. 6) may be otherwise made as an initializing operation when the electrical power source of the apparatus is turned on, or as a resetting operation when the electrical power source of the apparatus is turned off (for example, by utilizing the backup power). Therefore, in the latter case, when the apparatus is next powered on, the sequence starts from the step S3 of FIG. 6.

As has been described above, according to one aspect of the invention, in the head shifting device, in which the head is shifted by a first prescribed distance for a plurality of drive steps of the stepwise drive source, a preliminary shifting of the head is carried out by the first prescribed distance, and after the head is detected as-out of coincidence with a prescribed position, positioning of the head toward the prescribed position proceeds by a second prescribed distance which is much shorter than the first one, and the fact that the head has reached the prescribed position in that course of operation is detected to stop the head from further shifting, thereby giving an advantage that the adjustment of the head to the prescribed position can be formed always with high accuracy.

According to another aspect of the invention, in the head shifting device in which the head is shifted by a prescribed distance for a plurality of drive steps of the stepwise drive source, as the head is preliminarily shifted by the prescribed distance, after the fact that the head has overrun the prescribed position is detected, positioning of the head toward the prescribed position is carried out until the stepwise drive source takes a prescribed phase of rotation, thereby giving an advantage that the adjustment of the head to the prescribed position can be formed always with high accuracy despite the drive phase of the stepwise drive source was changed.

What is claimed is:

1. A head shifting device for a recording and/or reproducing apparatus, comprising:
  (A) shifting means for shifting a recording and/or reproducing head to a position in a recording area on a recording medium;
  (B) driving means for driving said shifting means on the basis of one of a first and a second shifting mode, in which in said first shifting mode, said head is shifted stepwise by a first predetermined amount with "n" drive steps of a stepwise drive source, where "n" is an integer no smaller than "2", and in said second shifting mode, said head is shifted stepwise with a second predetermined amount which is less than said first predetermined amount;
  (C) first detecting means for detecting that said head has reached a first reference position which is set outside of said recording area;
  (D) second detecting means for detecting that said head has reached a second reference position different from said first reference position, said second reference position representing a position of a recording track which forms a starting point of said recording area; and
  (E) control means responsive to said first and second detecting means for controlling said driving means in such a way that said shifting means is driven on the basis of the first shifting mode toward the first reference position until said first detecting means detects that said head has reached the first reference position, and after the detection by said first detecting means, said shifting means is driven on the basis of said second shifting mode toward the second reference position until said second detecting means detects that the head has reached the second reference position, said first and second detecting means being arranged to detect the reference positions by detecting a phase of a driving position of said driving means.

2. A head shifting device according to claim 1, wherein said second predetermined amount corresponds to "m" drive steps of said driving means, where "m" is an integer smaller than said "n".

3. A head shifting device according to claim 2, wherein said "m" is equal to "1".

4. A device according to claim 1, wherein said recording medium is a flexible magnetic disc-shaped recording medium.

5. A device according to claim 1, wherein said first and said second detecting means are arranged so as to detect the position of the head from movements of different movable members in a mechanism incorporating said shifting means, respectively.

6. A device according to claim 5, wherein one of said movable members is arranged to detect an angle of rotation of a rotary shaft of a stepping motor.

7. A device according to claim 6, wherein a different one of said movable members is a head position indicating member arranged to operate in association with the head shifting means.

8. A head shifting device for a recording and/or reproducing apparatus, comprising:
   (A) shifting means for shifting a recording and/or reproducing head to a recording area on a disc-shaped recording medium;
   (B) driving means, including a stepwise drive source, for driving said shifting means on the basis of one of a first and a second shifting mode, in which in said first shifting mode, said head is shifted stepwise by a first predetermined amount by the stepwise drive source and, in said second shifting mode, said head is shifted stepwise with a shift amount less than said predetermined shift amount;
   (C) first detecting means for detecting that said head has reached a first reference position which is set outside of said recording area;
   (D) second detecting means for detecting that said head has reached a second reference position different from said first reference position, said second reference position representing a starting position of said second recording area; and
   (E) control means responsive to said first and second detecting means for controlling said driving means in such a way that said shifting means is driven on the basis of said first shifting mode toward the first reference position until said first detecting means detects that said head has reached the first reference position, and, after the detection by said first detecting means until said second detecting means detects that said head has reached said second reference position, said shifting means is driven on the basis of the second shifting mode toward the second reference position, said first and second detecting means being arranged to detect the reference positions by detecting a phase of a driving position of said driving means.

9. A head shifting device according to claim 8, wherein said predetermined shift amount is determined by "n" drive steps of said drive source, where "n" is an integer no smaller than "2".

10. A head shifting device according to claim 9, wherein said "n" is an integer multiple of the number of the drive stops of said drive source.

11. A head shifting device according to claim 10, wherein said shift amount less than said predetermined shift amount corresponds to "m" drive steps of said drive source, where "m" is an integer smaller than said "n".

12. A head shifting device according to claim 11, wherein said "m" is 1.

13. A head shifting device according to claim 8, wherein said recording and/or reproducing apparatus is arranged to record or reproduce information signals on said recording medium by means of said head.

14. A head shifting device according to claim 13, wherein said recording medium includes, in addition to said area for recording an area other than the recording area.

15. A head shifting device according to claim 14, wherein said first reference position is located out of the area on the recording medium, and said second position is located in the area on the recording medium.

16. A head shifting device according to claim 8, wherein said recording and/or reproducing apparatus is arranged to record on or reproduce from a disc-shaped record bearing medium by means of said head.

17. A shift device in a recording and/or reproducing apparatus for recording or reproducing information signals on or from a disc-shaped recording medium by means of a recording and/or reproducing head, comprising:
   (A) head carriage means for supporting said head, said head carriage means being slidable in a radial direction of said disc-shaped recording medium;
   (B) shifting means for shifting said head carriage means in a radial direction of said disc-shaped recording medium to position said head to an area on said disc-shaped recording medium;
   (C) detecting means for detecting that said head has reached a first reference position; and
   (D) control means, responsive to said detecting means, having a first shifting mode in which said head is shifted stepwise with a predetermined shift amount by a stepwise drive source, and a second shifting mode in which said head is shifted stepwise with a shift amount less than said predetermined shift amount, said control means controlling said shifting means in such a way that the head carriage means is shifted at least in a peripheral direction of said disc-shaped recording medium on the basis of said first shifting mode toward said first reference position until said detecting means detects that said head has reached said first reference position, and after said detection by said detecting means the head carriage means is shifted in a centrical direction of the disc-shaped recording medium on the basis of said second shifting mode, said detecting means being arranged to detect a second reference position on the basis of a phase of rotation of a rotor shaft of said stepwise drive source.

18. A shifting device according to claim 17, wherein said device further comprises a power source and said control means controls said head carriage means so as to shift said head carriage means in a radial direction of said recording medium when the control means is supplied with power by said power source.

19. A shifting device according to claim 17, wherein said disc-shaped recording medium has thereon a plurality of concentric recording tracks in said area.

20. A shifting device according to claim 19, wherein said reference position is located at a predetermined position on an outermost periphery of said disc-shaped recording medium outside of said recording area, and a second reference position of said head is located at a predetermined position on an outermost peripheral one of the recording tracks of said recording area on said recording medium.

21. A head position adjusting device, comprising:
   (A) head shift control means including a stepping motor for driving a head for shifting said head stepwise with predetermined steps when the head is moved toward a first reference position located outside of a recording area on a recording medium and for shifting said head stepwise with smaller steps than said predetermined steps when the head is moved from said first reference position to a second reference position located inside of said recording area;
   (B) first detecting means for detecting that said head has reached the first reference position; and
   (C) second detecting means for detecting that the head has reached the second reference position of said recording area by detecting a rotating phase of said stepping motor, head shift control means including a stepping motor for driving said second detecting means being arranged to detect an angle of a rotating shaft of said stepping motor.

22. A head position adjusting device according to claim 21, wherein said head shift control means includes a transmitting mechanism disposed between said head and said stepping motor, said transmitting mechanism including adjusting means for adjusting detecting position of said second detecting means.

23. A head position adjusting device, comprising:
(A) head shift control means for shifting a head stepwise with predetermined steps when the head is moved toward a first reference position located outside of a recording area on a recording medium and for shifting said head stepwise with smaller steps than said predetermined steps when the head is moved from said first reference position to a second reference position located inside of said recording area;
(B) first detecting means for detecting said head has reached the first reference position; and
(C) second detecting means for detecting that the head has reached the second reference position, one of said first and second detecting means being arranged to detect an angle of rotation of a rotating shaft of said stepping motor, wherein said head shift control means includes a stepping motor for driving the head, said second detecting means being arranged to detect an angle of rotation of a rotating shaft of said stepping motor.

24. A head shifting device for a recording and/or reproducing apparatus, comprising:
(A) head shifting means for shifting a recording and/or reproducing head to a plurality of recording positions in a recording area on a recording medium;
(B) driving means including a stepping motor, for driving said head shifting means in a first shifting mode in which said head is shifted by a first amount and a second shifting mode in which said head is shifted by a second amount smaller than said first amount;
(B) first detecting means for detecting that said head has a reference position out of the recording area;
(C) second detecting means for detecting that said head has reached a starting position of the recording area on the basis of a phase of rotation of a rotary member of said stepping motor; and
(D) control means for controlling said driving means to drive said head shifting means in a first shifting mode until said detecting means detecting said head reaches said reference position and to drive said head shifting means in a second shifting mode, said control means being arranged to cause said stepping motor to drive said head shifting means from said reference position toward said starting position in said second shifting mode and to stop said stepping motor in response to said second detecting means detecting said head reached to said starting position on the basis of the phase of rotation of said rotary member.

25. A device according to claim 24, wherein said driving means driving said shifting means to said reference position in said first shifting mode, in which said head is shifted stepwise by said first amount with "n" drive steps of said step, where "n" is an integer not smaller than "2", and driving said shifting means in said second shifting mode toward said starting position until said detecting means detects said starting position.

26. A device according to claim 25, wherein said driving means drives said shifting means, in said second shifting mode in which said head is shifted stepwise by an amount which is less than said first amount "n", after the detection of said reference position by said first detecting means.

27. A device according to claim 26, further comprising a means for detecting said starting position on the basis of a phase of rotation of a rotating member connected to said driving means.

28. A head shifting device for a recording and/or reproducing apparatus, comprising;
(A) head shifting means for shifting a recording and/or reproducing head to a plurality of recording positions in a recording area on a recording medium;
(B) driving means including a stepping motor, for driving said shifting means in a predetermined shifting mode in which said head is shifted by a predetermined amount; and
(C) detecting means for detecting that said head has reached a reference position out of the recording area, said driving means driving said shifting means in the predetermined shifting mode, in which said head is shifted stepwise by the predetermined amount with "n" drive steps of said step, where "n" is an integer not smaller than "2" toward said reference position until said detecting means detects said reference position, and wherein said driving means drives said shifting means, in another shifting mode in which said head is shifted stepwise by an amount which is less than said predetermined amount "n", after the detection of the reference position by said detecting means, and wherein said driving means drives said shifting means, in said another shifting mode toward a starting position of said recording area, and further wherein said device further comprises:
a second detecting means for detecting said starting position on the basis of a phase of rotation of a rotating member connected to said driving means.

29. A head position adjusting device, comprising:
(A) head shift control means for shifting a head stepwise with predetermined steps when the head is moved toward a first reference position located outside of a recording area on a recording medium and for shifting said head stepwise with smaller steps than said predetermined steps when the head is moved from said first reference position to a second reference position located inside of said recording area;
(B) first detecting means for detecting that said head has reached the first reference position;
(C) second detecting means for detecting that the head has reached the second reference position;
said head shift control means including a stepping motor for driving the head, one of said first and second detecting means being arranged to detect an angle of rotation of a rotating shaft of said stepping motor;
wherein said head shift control means includes a stepping motor for driving the head, said second detecting means being arranged to detect an angle of rotation of a rotating shaft of said stepping motor.

* * * * *